A. J. LAWSON.
BORDER LIGHT.
APPLICATION FILED JULY 19, 1917.
1,360,417. Patented Nov. 30, 1920.
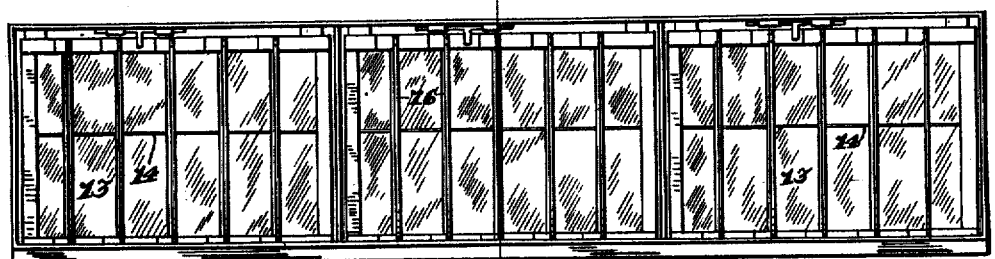
Fig. 1
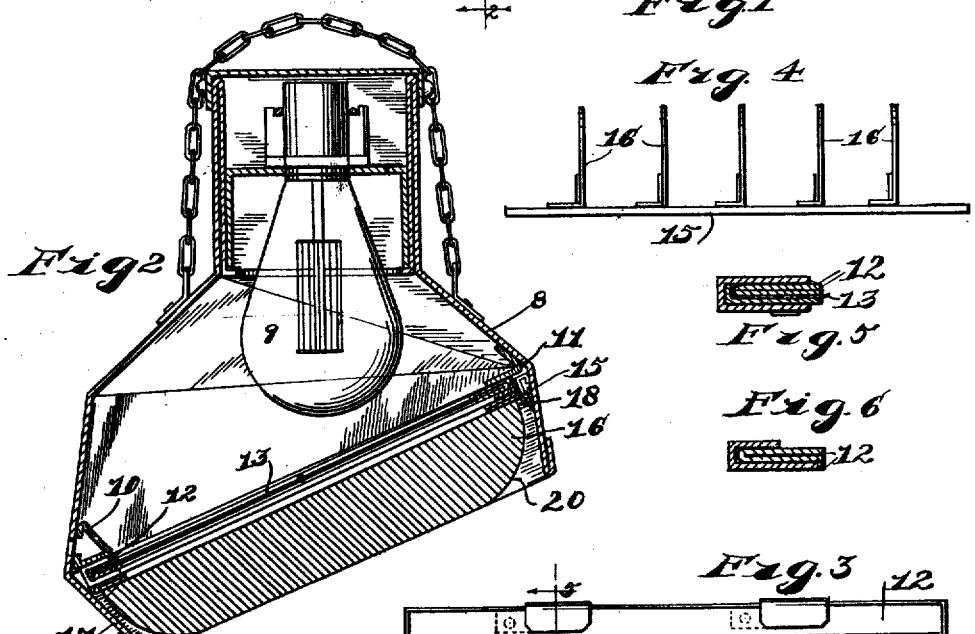
Fig. 2
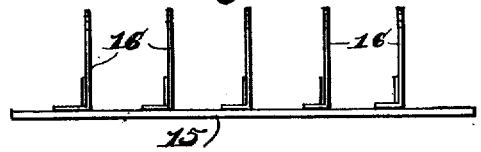
Fig. 4
Fig. 5
Fig. 6
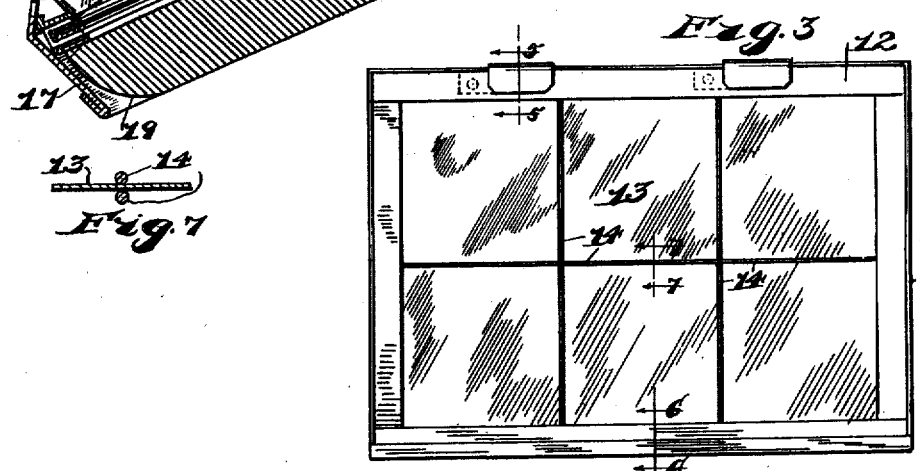
Fig. 3
Fig. 7
Witnesses
Willis King
B. J. Richards
Inventor
Arthur J. Lawson
By Joshua R. H. Potts
his Attorney

UNITED STATES PATENT OFFICE.

ARTHUR J. LAWSON, OF CHICAGO, ILLINOIS.

BORDER-LIGHT.

1,360,417.   Specification of Letters Patent.   Patented Nov. 30, 1920.

Application filed July 19, 1917. Serial No. 181,489.

*To all whom it may concern:*

Be it known that I, ARTHUR J. LAWSON, a citizen of the United States, and a resident of the city of Chicago, county of Cook, and State of Illinois, have invented certain new and useful Improvements in Border-Lights, of which the following is a specification.

My invention relates to improvements in border lights, and has for its object the provision of an improved construction of this character which is simple and efficient in use.

The invention consists in the combinations and arrangements of parts hereinafter described and claimed.

The invention will be best understood by reference to the accompanying drawings forming a part of this specification, and in which, Figure 1 is an under face view of a light embodying my invention, Fig. 2, a section taken on line 2—2 of Fig. 1, Fig. 3, an enlarged detail view of one of a plurality of transparency frames employed in the construction, Fig. 4, a detail view of one of a plurality of slat frames employed in the construction, Fig. 5, an enlarged section taken on line 5—5 of Fig. 3, Fig. 6, an enlarged section taken on line 6—6 of Fig. 3, and Fig. 7, an enlarged section taken on line 7—7 of Fig. 3.

The preferred form of construction, as illustrated in the drawings, comprises a suitable sheet metal housing 8 divided into a number of compartments having open lower sides equipped with a suitable electric light 9, said housing being also equipped with suitable means for suspending the same. Stops or abutments 10 and 11 are arranged at the side of each of the said compartments and removable transparency frames 12 are positioned thereagainst. Each of the frames 12 is provided with a colored transparency 13 such as thin colored transparent celluloid reinforced by transverse wires 14. Each of the frames 12 is made up of two sheet metal frames fitting one within the other and clamping the colored transparency 13 between them, said frames being held together by two clamps or clips, as best illustrated in Figs. 3, 5 and 6. A slat frame 15 is positioned immediately adjacent each transparency frame 12, each of said slat frames being provided with a plurality of transverse parallel slats 16 forming spaces for the emission of light. The lower rear edge 17 of each of the compartments is inwardly inclined as indicated, to prevent removal of the corresponding edge of the frames and a swinging frictional fastening 18 is provided at the opposite edge to hold the frames in place, the corners 19 and 20 of the slats 16 being rounded as indicated to facilitate insertion and removals, the edge 19 being more pronouncedly rounded than the edge 20 to compensate for the inward sloping of the edge 17. The sides of the slats 16 are covered with aluminum paint or other suitable reflecting material. By this arrangement, it will be observed that the light emitted from each compartment will be concentrated into a certain area by the action of the corresponding slats 16 and said light will be thoroughly distributed and intensified by the reflector action of the sides of the slats 16.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A light housing divided into a plurality of compartments having open sides; a light in each of said compartments; a removable colored transparency arranged over the open side of each compartment; and a removable frame arranged over each transparency and provided with a plurality of parallel slats the sides of said slats being provided with reflecting surfaces, substantially as described.

2. A light housing divided into a plurality of compartments having open sides; a light in each of said compartments; a removable colored transparency arranged over the open side of each compartment; and a removable frame arranged over each transparency and provided with a plurality of parallel slats, the sides of said slats being covered with light reflecting paint, substantially as described.

In testimony whereof I have signed my name to this specification in the presence of two subscribing witnesses.

ARTHUR J. LAWSON.

Witnesses:
ARTHUR A. OLSON,
JOSHUA R. H. POTTS.